3 Sheets—Sheet 1.

C. E. ALBRO.
Gear-Cutting Machine.

No. 219,892. Patented Sept. 23, 1879.

WITNESSES
J. E. Carpenter
Geo. P. Reyington

INVENTOR
Charles E. Albro
By J. R. Nottingham
Asso. ATTORNEY

N. PETERS, PHOTO-LITHOGRAPHER, WASHINGTON, D. C.

C. E. ALBRO.
Gear-Cutting Machine.

No. 219,892. Patented Sept. 23, 1879.

WITNESSES
INVENTOR
Charles E. Albro
By J. R. Nottingham
Asso. ATTORNEY

C. E. ALBRO.
Gear-Cutting Machine.

No. 219,892. Patented Sept. 23, 1879.

WITNESSES
J. C. Carpenter
Geo. H. Byington

INVENTOR
Charles E. Albro.
By J. R. Nottingham
His ATTORNEY

UNITED STATES PATENT OFFICE.

CHARLES E. ALBRO, OF CORTLAND VILLAGE, NEW YORK.

IMPROVEMENT IN GEAR-CUTTING MACHINES.

Specification forming part of Letters Patent No. 219,892, dated September 23, 1879; application filed December 24, 1878.

*To all whom it may concern:*

Be it known that I, CHARLES E. ALBRO, of Cortland Village, in the county of Cortland and State of New York, have invented certain new and useful Improvements in Gear-Cutting Machines; and I do hereby declare that the following is a full, clear, and exact description of the invention, which will enable others skilled in the art to which it appertains to make and use the same, reference being had to the accompanying drawings, and to the letters and figures of reference marked thereon, which form a part of this specification, in which drawings similar letters of reference indicate like parts.

Figure 1:
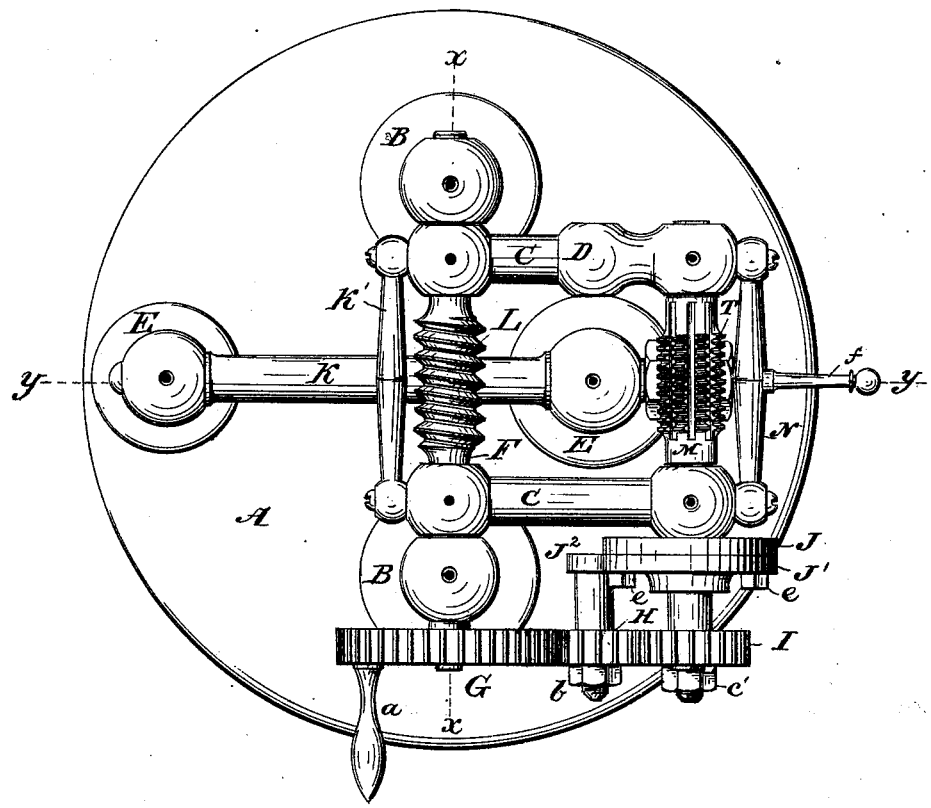
Figure 2:
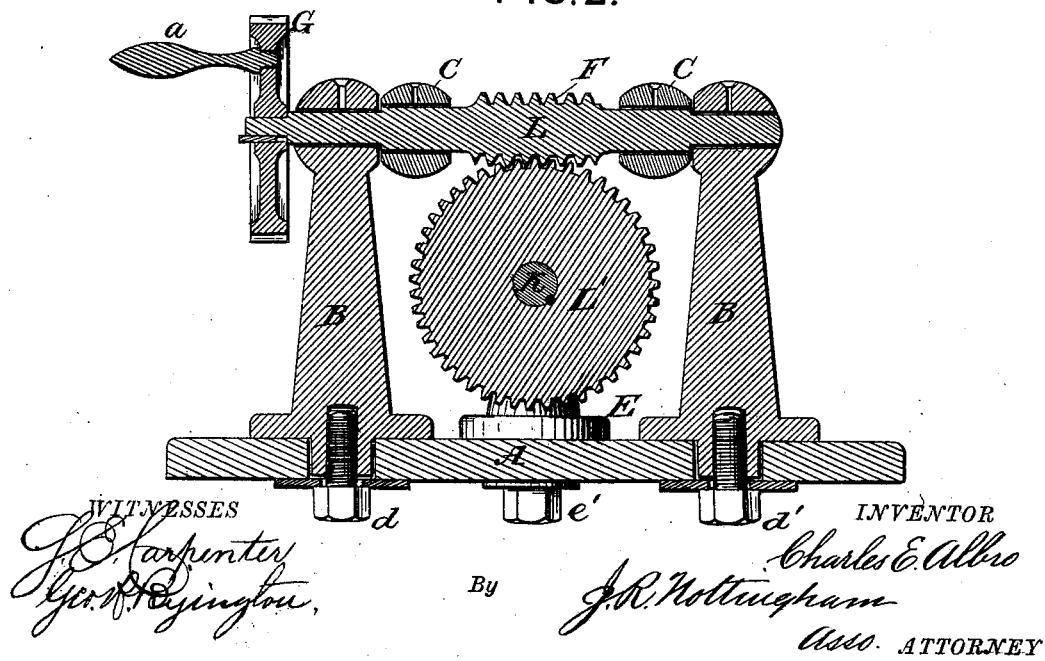
Figure 3:
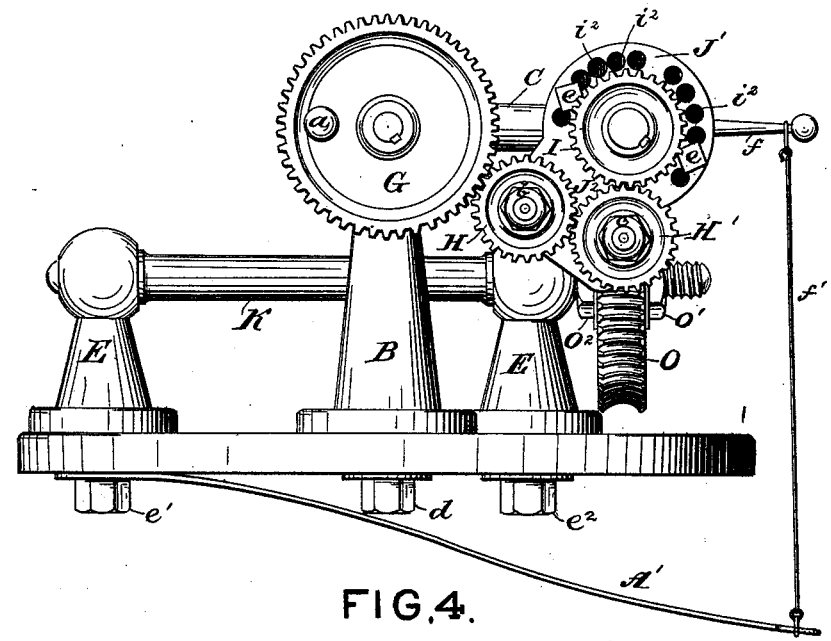
Figure 4:
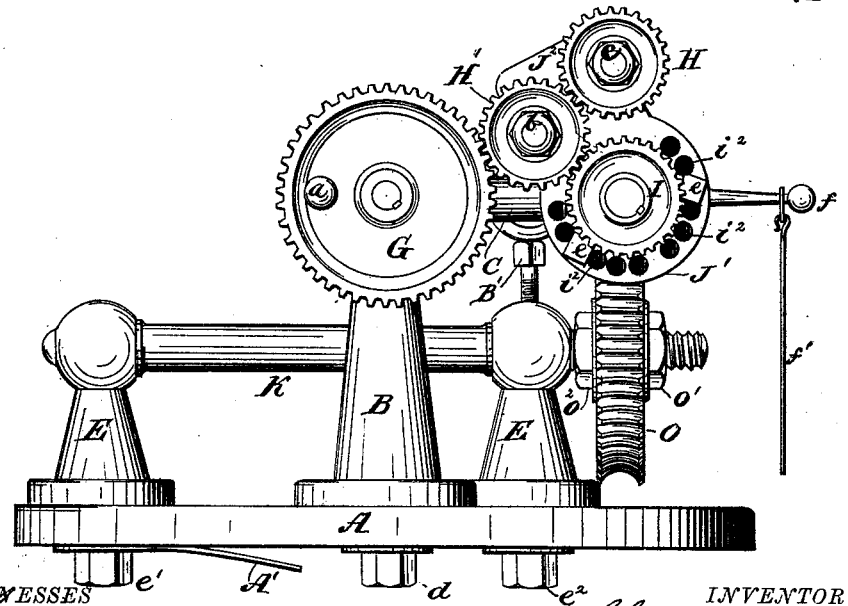
Figure 5:
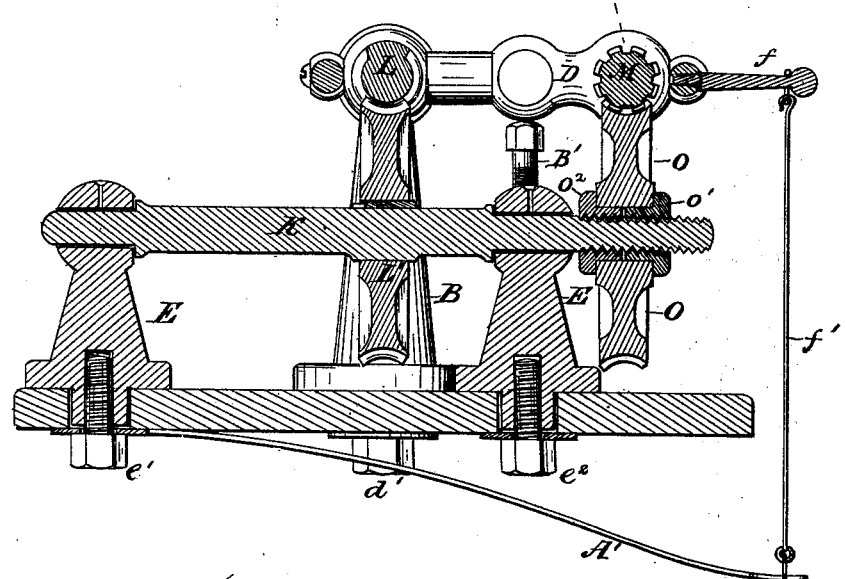
Figure 6:
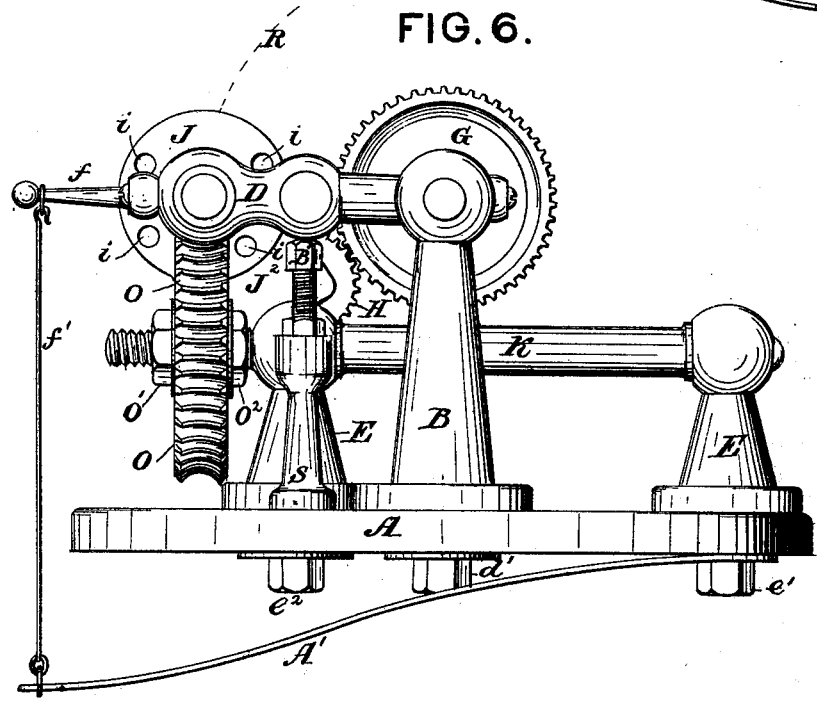

In the drawings, Figure 1 is a plan view of my improved machine, showing the construction, general arrangement, and combination of the different parts. Fig. 2 is a vertical section of the master endless screw and its arrangements, the said section being taken on the dotted line $x\,x$ on Fig. 1. Fig. 3 is a side view of my said machine, showing the construction and the general form and arrangements of the parts and the gearing in such a position as to cut the teeth at a certain angle to the face of the wheel—that is, right-handed teeth. Fig. 4 is a side view, the same as Fig. 3, except that the gearing is changed so as to cut teeth at a different angle than when the gearing is in the form shown in Fig. 3—that is, left-handed teeth. Fig. 5 is a vertical section of the machine, taken on the line $y\,y$ of Fig. 1. Fig. 6 is a side view of the opposite side of the machine to that shown in Figs. 3 and 4.

My invention relates more particularly to that class of endless screws in which the points of the teeth and the bottoms of the spaces are formed of a concave outline adapted to the convexity of the screw, in order to present as much bearing-surface as possible to its action.

The teeth of the wheel in an endless screw are not, as in ordinary kinds of gearing, set perpendicularly to the plane of its face, but at an angle, and with surfaces corresponding to the inclination and helical form of the thread of the screw. The outlines of the teeth are helical surfaces described about the cylinder, forming the screw with the proper pitch.

The old method of cutting the teeth in the wheel has been to first nick or cut them as much as possible in an ordinary gear-cutter, and then to dress them out and give the teeth the proper curved outlines by means of a hob made particularly for the purpose, and revolved in the nicks or spaces made by the gear-cutter.

The object of my invention is to cut the teeth in the surface of the face of the wheel of an endless screw completely when the said wheel is of large or small diameter, or the teeth coarse or fine, or for a right or left worm or screw.

My invention consists in the construction, combination, and arrangement of the parts of the machine hereinafter explained, by means of which the said teeth are cut in the smooth face of the wheel by a hob revolving thereon, so that said teeth are cut automatically from the beginning, as hereinbefore and hereinafter explained, shown, and set forth; and my invention further consists in the herein-described application of the said hob to cut the said teeth aforesaid.

I will now proceed to describe the construction of my improved machine, reference being had to the accompanying drawings.

In Figure 1, A is the bed-plate of the machine, which is made of metal or other suitable material. To cut larger wheels the bed-plate is partly cut away. (Not shown.)

B B indicate posts or standards, having bearings therein, and securely fastened to said bed-plate by bolts $d\,d'$ secured therein, as shown in Fig. 2. E E indicate two standards, having bearings therein, and securely fastened to the bed-plate by bolts $e^1\,e^2$, as shown in Fig. 5. The letter S represents a standard, securely fastened to said bed-plate, having in its upper end a screw, B', which can be screwed in or out of said standard S. L represents a shaft, made of steel, revolving in bearings in B B. The letter G represents a gear-wheel, keyed on shaft L, with crank-handle $a$ thereon. F represents a screw or worm on the shaft L, which drives the worm-wheel L'.

C C represent arms having bearings on L, as shown in Fig. 2. M represents a shaft, made of steel, having a tap or cutter thereon. The letter I represents a gear-wheel keyed to shaft M. J J' indicate flanges of a coupling, the two parts being held together by bolts $e\,e$.

The letters $i^2\ i^2\ i^2$ are holes for changing the said bolts $e\ e$, so that different-sized gear-wheels can be used, as hereinafter more fully explained.

The part $J^1$ of the coupling has a projecting piece, $J^2$, in which are placed two short studs, to which the gear-wheels H H' are fastened by nuts $b\ c$.

N K' indicate two rods, of metal, screwed on arms C C, for the purpose of preventing any lateral motion. Letter $f$ is an arm projecting from rod N, to which the rod $f'$ is fastened, the lower end of said rod $f'$ being connected to spring $A^1$.

L' represents a worm-wheel securely keyed to shaft K, and driven by the screw F. $o^1$ and $o^2$ are half-nuts screwing on the shaft K, clamping and holding securely in position the blank O upon which the teeth are to be cut. D is an enlargement on the arm C, for the purpose of resting on the head of the bolt B', which regulates the depth of the teeth to be cut.

The tap or cutter T on the shaft M is made of hardened steel, and is grooved longitudinally, as shown in Figs. 1 and 5, so as to cut the teeth in the blank O.

The pitch of the tap or cutter T is made to correspond with the number of teeth to be cut in the blank, and the cutter must be so geared that it makes a revolution to each tooth that is to be cut. The thread of said tap or cutter must be made accurately, as also the thread of the teeth of the worm-wheel L'.

The blank O is the wheel on which the teeth are to be cut, and is securely fastened on the shaft K, as hereinbefore explained, and as shown in Fig. 5.

The periphery of the blank O is made concave, as shown in Fig. 5. The tap or cutter T is made to press hard upon the blank O by connecting the projection $f$ and the spring $A^1$ together by means of the rod $f'$, when the spring $A^1$ causes the cutter T to hug the blank as far as the screw B' will permit, the screw B' thus regulating the depth of the teeth to be cut.

The arms C C, turning about the shaft L, can be raised, as shown by dotted line R, Fig. 5, readily allowing the blank O to be taken off or put on; and in the same manner different wheels can be put on and taken off, as described.

The arms C C can be made longer than shown, if desired, so that wheels of a larger diameter can be put on the shaft K, and thus allow the wheel being cut to pass below the plate, thereby allowing the teeth on large wheels to be cut.

It is evident that various devices may be made to take the place of the spring $A^1$ and rods $f$ and $f'$—as, for instance, a weight or coiled spring may be substituted. Also, it is evident that various different devices forming the standard S and screw or bolt B' may be used for regulating the depth to which the teeth are to be cut.

In Fig. 3 the gear-wheel I revolves in a contrary direction to the wheel G. In Fig. 4 the wheel I revolves in the same direction as the wheel G. This change is made by unscrewing the bolts $e\ e$, Fig. 3, and swinging the part $J'$, which turns on the shaft M, until the wheel H' gears into the wheel G, as shown in Fig. 4, the wheel H running idle, and then fastening by screwing said bolts into holes $i^2\ i^2$, &c.

In the construction of my improved machine I usually make use of metal of dimensions depending upon the size of the machine required and the strains to which it will be subjected.

Having thus described the construction of my improved machine, I will now proceed to describe its use and operation.

The machine being as shown in Figs. 1 and 3, the blank upon which it is desired to cut the teeth is placed and clamped on the shaft K, and the rods $f\ f'$ and spring $A^1$ are connected.

Motion is given to the gear-wheel G either by means of the handle $a$, or by a spur-wheel gearing into the wheel G from any suitable power, and the shaft I is thus made to revolve, which causes the screw F to impart motion to the wheel L' and shaft K, and the blank O thus revolves.

The shaft M is caused to revolve by the wheels G, H, H', and I, which causes the tap or cutter T to revolve, and the said cutter thus commences to cut the teeth required.

The blank O being also revolved uniformly by L', and the tap or cutter T being revolved uniformly by the spur-gearing, the teeth on the blank are cut uniformly and accurately.

The whole machine being put in motion, it is continually cutting the teeth in the blank, and the depth of said teeth is regulated by the screw B'. It will be seen that the teeth in said blank are being cut automatically.

The drawings show triangular teeth and threads; but it is obvious that square-shaped teeth can be easily cut by simply changing the threads of the tap or cutter.

The tap or cutter T can be readily and easily changed, and coarser or finer threaded taps or cutters substituted. These holes can be made in a circular slot by cutting out the spaces between each two contiguous holes, and thus the part $J^2$ can be shifted so as as to permit a great variety of spur-wheels to be used in the place of G to regulate the speed of the tap or cutter by changing the bolts $i^2\ i^2\ i^2$.

It is evident that the speed of the tap or cutter T is to be regulated by the number of teeth to be cut; but there must be such a ratio between the gears that this will be obtained.

It will be seen that the wheel L' and screw F give a very accurate and uniform motion to the shaft K and blank O. It is necessary therefore that this master endless screw F and L' should be very perfectly and accurately made, so as to give a uniform motion to the blank O.

It is likewise necessary that the gearing G, H, H', and I should be very accurately made for the same purpose.

It will thus be seen that the teeth are cut automatically, and that the blank is not removed during the entire operation.

Having thus described my invention, its construction and operation, what I claim, and desire to secure by Letters Patent, is—

1. In a gear-cutting machine, the combination of the tap or cutter, feed mechanism, and intermediate operating mechanism journaled in a swinging frame, whereby the blank is given to the cutter by a positive feed, substantially as described.

2. A tap or cutter, revolved and made substantially in the manner hereinbefore described, journaled in a swinging frame, the pivotal point of which is the main shaft L, applied to a blank-wheel revolved as hereinbefore set forth, whereby the teeth are automatically cut upon the face of the said blank, and the cutter released without disturbing the feed, substantially in the manner and for the purpose herein specified and shown.

3. In the gear-cutting machine described, the combination of the feed-screw F and wheel L′, operating and working as shown, the shaft K, and the tap or cutter journaled in a swinging frame, and held in operating contact with the blank by means of the spring $A^1$ and link $f'$, substantially in the manner and for the purpose herein described and shown.

4. In the gear-cutting machine herein described, the standard S, substantially fastened to the bed-plate A, and having the screw B′ therein, combined with the swinging frame, the spring $A^1$, and connecting-rod $f$, for the purpose of regulating the depth of the teeth to be cut on the blank O, substantially in the manner described and shown.

5. In the gear-cutting machine herein described, the combination of the gear-wheels G, H, H′, and I, journaled on a swinging frame and combined therewith, substantially as and for the purpose hereinbefore specified and shown.

6. The combination and arrangement, with the cutter T, journaled in a swinging frame, of the rods N, $f$, and $f'$, spring $A^1$, and bed-plate A, all made, arranged, and combined substantially in the manner and for the purpose herein described and shown.

7. In the gear-cutting machine described, the spring $A^1$, rods $f f'$, and standard S with screw B′, arranged and combined with the cutter T, journaled in a swinging frame to hold the same in operating contact with the blank O, as and for the purposes set forth.

CHARLES E. ALBRO.

Witnesses:
WILLIAM D. TUTTLE,
GEORGE S. SANDS.